(12) United States Patent
Gu

(10) Patent No.: US 11,625,587 B2
(45) Date of Patent: Apr. 11, 2023

(54) ARTIFICIAL INTELLIGENCE INTEGRATED CIRCUIT

(71) Applicant: Shanghai Zhaoxin Semiconductor Co., Ltd., Shanghai (CN)

(72) Inventor: Deming Gu, Shanghai (CN)

(73) Assignee: GLENFLY TECHNOLOGY CO., LTD., Shanghai (CN)

(*) Notice: Subject to any disclaimer, the term of this patent is extended or adjusted under 35 U.S.C. 154(b) by 601 days.

(21) Appl. No.: 16/745,675

(22) Filed: Jan. 17, 2020

(65) Prior Publication Data

US 2021/0209451 A1 Jul. 8, 2021

(30) Foreign Application Priority Data

Jan. 3, 2020 (CN) .......................... 202010004385.4

(51) Int. Cl.
| | |
|---|---|
| *G06N 3/063* | (2023.01) |
| *G06N 3/08* | (2023.01) |
| *G06N 3/04* | (2023.01) |
| *G06F 17/16* | (2006.01) |

(52) U.S. Cl.
CPC ............ *G06N 3/063* (2013.01); *G06F 17/16* (2013.01); *G06N 3/04* (2013.01); *G06N 3/08* (2013.01)

(58) Field of Classification Search
CPC ............ G06N 3/049; G06N 3/02; G06N 3/08; G06N 20/00; G06N 3/088; G06N 5/022
See application file for complete search history.

(56) References Cited

U.S. PATENT DOCUMENTS

| | | | | |
|---|---|---|---|---|
| 4,442,487 | A | * | 4/1984 | Fletcher .............. G06F 12/0888 711/E12.024 |
| 7,904,951 | B1 | * | 3/2011 | Ebrahimi ............ H04L 63/0884 713/153 |
| 2019/0095333 | A1 | * | 3/2019 | Heirman ............. G06F 12/0862 |
| 2019/0325303 | A1 | * | 10/2019 | Daga ...................... G06N 3/063 |
| 2019/0362461 | A1 | * | 11/2019 | George .................... G06N 3/08 |
| 2020/0042240 | A1 | * | 2/2020 | Therene .............. H04L 67/1097 |
| 2020/0265276 | A1 | * | 8/2020 | Xu ......................... G06T 11/003 |
| 2020/0327048 | A1 | * | 10/2020 | Mcclure .............. G06F 12/1027 |

\* cited by examiner

*Primary Examiner* — Todd Buttram

(74) *Attorney, Agent, or Firm* — McClure, Qualey & Rodack, LLP

(57) ABSTRACT

An artificial intelligence integrated circuit is provided. The artificial intelligence integrated circuit includes a flash memory, a dynamic random access memory (DRAM), and a memory controller. The flash memory is configured to store a logical-to-physical mapping (L2P) table that is divided into a plurality of group-mapping (G2P) tables. The memory controller includes a first processing core and a second processing core. The first processing core receives a host access command from a host. When a specific G2P table corresponding to a specific logical address in the host access command is not stored in the DRAM, the first processing core determines whether the second processing core has loaded the specific G2P table from the flash memory to the DRAM according to the values in a first column in a first bit map and in a second column of a second bit map.

13 Claims, 3 Drawing Sheets

ARTIFICIAL INTELLIGENCE INTEGRATED CIRCUIT

CROSS REFERENCE TO RELATED APPLICATIONS

This application claims priority of China Patent Application No. 202010004385.4, filed on Jan. 3, 2020, the entirety of which is incorporated by reference herein.

BACKGROUND OF THE INVENTION

Field of the Invention

The present invention relates to an integrated circuit and, in particular, to an artificial intelligence (AI) integrated circuit (IC).

Description of the Related Art

As technologies of artificial intelligence (AI) develop, the amount of computation of AI technologies grows. Thus, various deep-learning accelerators are provided on the market, such as central processing units (CPUs), graphic processing units (GPUs), tensor processing units (TPUs), field-programmable gate arrays (FPGAs), and application-specific integrated circuit (ASIC). The GPUs can be some of the most important deep-learning accelerators.

In comparison with a CPU, TPU, and FPGA, a GPU has better programmability, virtualization features, and a good software environment. However, the graphics-processing pipeline in the GPU itself has a lot of redundant functions for artificial intelligence operations, such as task management for graphics rendering, storage buffers, rasterization, and rendering output units, and the components mentioned above take up more than ⅓ of the area of the GPU. Thus, the GPU has a disadvantage in terms of performance/power ratio compared to ASIC.

Artificial intelligence operations can be divided into a training phase and an inference phase. In the training phase, the parameters of the artificial intelligence network are mainly based on samples. In the inference phase, the input parameters are used to convert input into a classification result. Currently, deep-learning accelerators on the market can be divided into two categories, the first is based on ASIC/FPGA, and the second is based on CPU/GPU.

The first type of deep-learning accelerators may be designed to mainly accelerate convolution and matrix calculations. The advantage is that the above operations are very efficient, but the disadvantage is that a customized software development package and compilers are needed to re-support all deep-learning frameworks. Thus, the adaption period of the software ecology of the first type of deep-learning accelerators is very long, and the adaptability of the new algorithms is very weak. Therefore, the design of the first type of deep-learning accelerators is only suitable for the inference stage.

The second type of deep-learning accelerators may include a main acceleration module with different instruction set architectures, such as single instruction multiple thread (SIMT), SSE, Matrix, and the like. The advantages of this type of accelerators are excellent software ecosystem, comprehensive develop tools, capability of virtualization, and excellent adaptability to algorithms. Thus, the CPU and GPU can be used in the training phase as well as in the inference phase. Because the GPU itself has parallel rendering units, so that the GPU can provide a greater speedup ratio than the CPU. However, the GPU is not dedicated for artificial intelligence calculation and there are a large number of graphics processing elements in the GPU, so that the GPU has a disadvantage in performance/power ratio compared to the ASIC accelerator. In addition, although the GPU can use, for example, an acceleration scheme such as Matrix or SIMT, there are too many 3D graphics-processing elements in the GPU. In addition, the GPU also lacks buffer pre-load techniques and data compression and storage methods required for an artificial intelligence chip.

Accordingly, there is a demand for an artificial intelligence integrated circuit to solve the aforementioned problem.

BRIEF SUMMARY OF THE INVENTION

In an exemplary embodiment, an artificial intelligence integrated circuit is provided. The artificial intelligence integrated circuit includes: a command processor, a plurality of processing elements, a task constructor, an L1 cache, and an L2 cache. The command processor is configured to analyze a command queue to generate one or more tasks. The task constructor is configured to receive the task from the command processor to generate a plurality of threads to control the processing elements. Each processing element includes: a plurality of arithmetic logic units (ALUs), a plurality of deep-learning accelerators, a common register file, and an access controller. The ALUs are configured to perform arithmetic and logic operations. The deep-learning accelerators are configured to perform hardware multiplication-addition operations, activation functions, and pooling. The common register file is configured to store data and intermediate results of operations performed by the ALUs and deep-learning accelerators. The access controller is configured to control data access to the L1 cache and the L2 cache.

In some embodiments, the access controller is configured to control the L1 cache and L2 cache to dynamically prefetch data stored in a memory unit external to the artificial intelligence integrated circuit, and the prefetched data is for use by matrix multiplication-addition operations performed by the deep-learning accelerators. In addition, the memory unit is a dynamic random access memory or a host buffer memory of a host that is electrically connected to the artificial intelligence integrated circuit.

In some embodiments, the L1 cache comprises a first preload circuit and the L2 cache comprises a second preload circuit, and the first preload circuit and the second preload circuit prefetch data from the L2 cache and the memory unit, respectively.

In some embodiments, when the access controller is tasked to write first data to the L1 cache, the first preload circuit sends the first data to a first data compressor for a first data compression process to generate second data, and writes the second data to the L2 cache. The second preload circuit sends the second data to a second data compressor for a second data compression process to generate third data, and the second data compressor writes the third data to the memory unit.

In some embodiments, the first data compression process is tasked to compress the first data using a compression algorithm for expanded matrix data to generate the second data, and the second data compression process is tasked to compress the second data using a residue-based image-compression algorithm and a sparse-matrix-compression algorithm to generate the third data.

In some embodiments, when the access controller is tasked to read the third data stored in the memory unit, the second preload circuit sends the third data to a second decompression circuit to perform a second data decompression process on the third data to obtain the second data. The first preload circuit directly transmits the second data to a first decompression circuit in each processing element to perform a first data decompression process on the second data to obtain the first data, and stores the first data in the common register file of each processing element.

In some embodiments, the deep-learning accelerator in each processing element includes: a matrix multiplication-addition calculator, an activation-function circuit, and a pooling circuit. The matrix multiplication-addition calculator is configured to perform a matrix multiplication-addition calculation on the first data to obtain a first matrix calculation result. The activation-function circuit is configured to perform activation on the first matrix calculation result to generate a second matrix calculation result. The pooling circuit is configured to perform pooling on the second matrix calculation result to generate a final result, and store the final result in the common register file.

In some embodiments, in response to the first data for matrix convolution calculation stored in the common register file being ready, the deep-learning accelerator loads the first data to a register file in the deep-learning accelerator, and load the first data from the register file to the matrix multiplication-addition calculator to perform matrix multiplication-addition operations.

In some embodiments, the first preload circuit and the second preload circuit can be set to a hardware mode or a software mode. In response to the first preload circuit and the second preload circuit being set to the hardware mode, the first preload circuit and the second preload circuit performs address prediction using the previously fetched data, and respectively prefetches data from the L2 cache and the memory unit according to the predicted address. In response to the first preload circuit and the second preload circuit being set to the software mode, the first preload circuit and the second preload circuit respectively fetch data from the L2 cache and the memory unit according to hint information from the software.

In some embodiments, the matrix multiplication-addition calculator supports matrix multiplication in any matrix size and accelerated multiplication of sparse matrices, and determines the calculation of loops according to the size and sparsity of matrices. In addition, the activation-function circuit supports rectified linear unit (ReLU), sigmod, and tanh functions, and the pooling circuit performs mean pooling or max pooling on the second matrix calculation result to generate the final result.

In some embodiments, the artificial intelligence integrated circuit supports application programming interfaces (API) of OpenCL, CUDA, and DirectCompute, and does not include a three-dimensional (3D) graphics rendering module.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
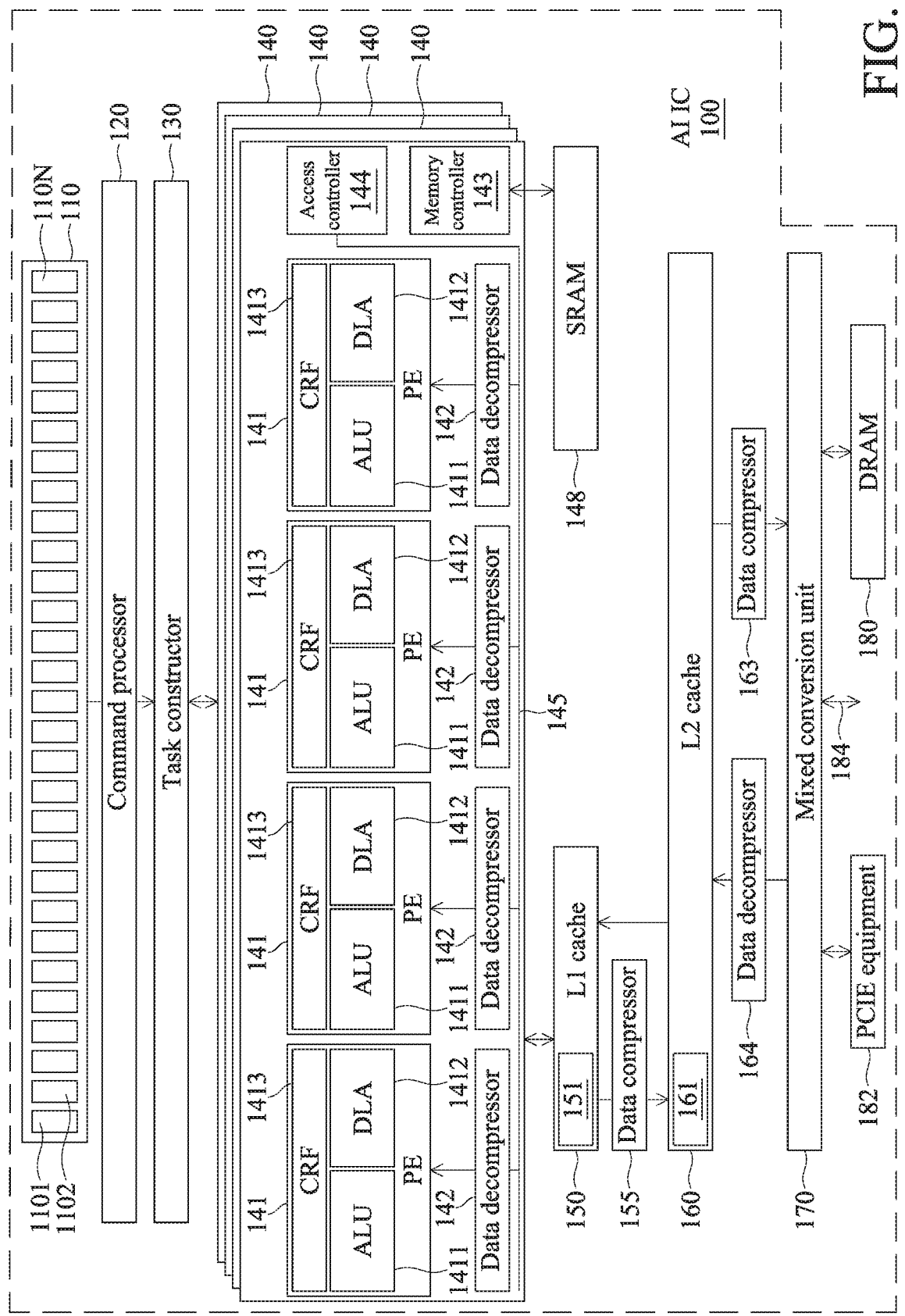
FIG. 1 is a block diagram of an artificial intelligence integrated circuit in accordance with an embodiment of the invention.

FIG. 1 is a block diagram of an artificial intelligence integrated circuit in accordance with an embodiment of the invention. As depicted in FIG. 1, the artificial intelligence integrated circuit 100 may mainly include a command buffer 110, a command processor 120, a task constructor 130, a plurality of processing elements (PEs) 140, a level-1 (L1) cache 150, a level-2 (L2) cache 160, and a mixed conversion unit (MXU) 170.

The command buffer 110 may be configured to receive an operation command from a host, and sequentially store the operation command in a command queue. In some embodiments, the command buffer 110, for example, may be a first-in-first-out (FIFO) buffer, but the invention is not limited thereto.

The command processor 120 may be configured to detect the commands to be processed in the command queue of the command buffer 110, and analyze the commands in the command queue (e.g., including entries 1101-110N) in accordance with a weight-based scheduling algorithm, and dispatch commands to the task constructor 130 to control different processing elements 140. The task constructor 130 may be configured to generate tasks or threads to be executed by respective processing elements 140. For example, the command processor 120 may parse commands of a general GPU application programming interface (API) of OpenCL, CUDA, or DirectCompute, etc., and distribute commands to the task constructor 130.

Each of the processing elements 140 may include a plurality of computing units 141, a plurality of data decompressors 142, a memory controller 143, and an access controller 144, wherein each computing unit 141 corresponds to each data decompressor 142. In addition, the artificial intelligence integrated circuit 100 may support virtualization, and allow dozens of different tasks to run in parallel. For example, each processing element 140 can perform parallel operations according to individual threads.

Each computing unit 141 may include an arithmetic logic unit (ALU) 1411, a deep-learning accelerator (DLA) 1412, a common register file (CRF) 1413. The arithmetic logic unit 1411 may be configured to perform common arithmetic and logic operations according to the threads from the task constructor 130. The deep-learning accelerator 1412 may be configured to perform artificial intelligence/deep learning related operations, such as a matrix multiplication-addition calculation (MAC) of any size, sparse matrix acceleration multiplication, activation function, and pooling. The command register file 1413 may be configured to store input matrices, calculation results, or intermediate numeric values of the arithmetic logic unit 1411 and deep-learning accelerators 1412.

The data decompressor 142, for example, may be a matrix decompressor that is configured to decompress the compressed matrix data read from the L1 cache 150, and store the decompressed matrix data in the common register file 1413 in each computation unit 141 or the common register file (not shown in FIG. 1) in each deep-learning accelerator 1412. Each data decompressor 142 is coupled to each other via bus 145.

The memory controller 143 may be configured to control accesses of the static random access memory (SRAM) 148, and the SRAM 148, for example, may be configured to store the temporary numeric values or data required by calculations performed by each processing element 140. The access controller 144 is configured to write data to the memory hierarchy or read data from the memory hierarchy. For example, the memory hierarchy may include the L1 cache 150, L2 cache 160, and the dynamic random access memory (DRAM) 180.

The L1 cache 150 is electrically connected to bus 145. Each data decompressor 142 may store data in the L1 cache 150, L2 cache 160, and/or the DRAM 180 (or the host buffer memory (HBM)) according to the requirements of calculations and a predetermined cache mechanism, where the predetermined cache mechanism, for example, may be controlled by the memory controller in each processing element 140. The L1 cache 150 and L2 cache 160 may be used as the first-level cache memory and the second-level cache memory in the memory hierarchy, respectively, and the storage capacity of the L1 cache 150 is less than that of the L2 cache. In some embodiments, the storage capacity of the L1 cache 150, for example, may be 8K bits, and the storage capacity of the L2 cache 160 may be 2K bits, but the invention is not limited to the aforementioned storage capacities.

When each processing element 140 performs data storage, the first data (e.g., image data or matrix data) stored in the common register file 1413 is written to the L1 cache 150. When the L1 cache 150 is tasked to write the first data to the L2 cache 160, the data compressor 155 (e.g., a matrix-data compressor) may perform a first data-compression process to compress the first data 150 to generate second data, and write the second data to the L2 cache 160. If the L2 cache 160 is tasked to write the second data to the DRAM 180, the compressor 163 may perform a second data-compression process to compress the second data to generate third data, and write the third data to the DRAM 180, wherein the third data can be regarded as the double compressed data.

In some embodiments, since the matrix operations of artificial intelligence or deep learning may require the use of a large amount of expanded matrix data, the aforementioned first data-compression process may use a well-known matrix-compression algorithm in the art of the present invention to compress the expanded matrix data. In addition, the matrix data is also often sparse matrices and image data, and thus the aforementioned second data-compression process may utilize the well-known residue-based image-compression algorithm and sparse-matrix compression algorithm in the art of the present invention. It should be noted that the first data-compression process and the second data-compression process are both lossless compression algorithms to ensure the correctness of the data.

Figure 3:
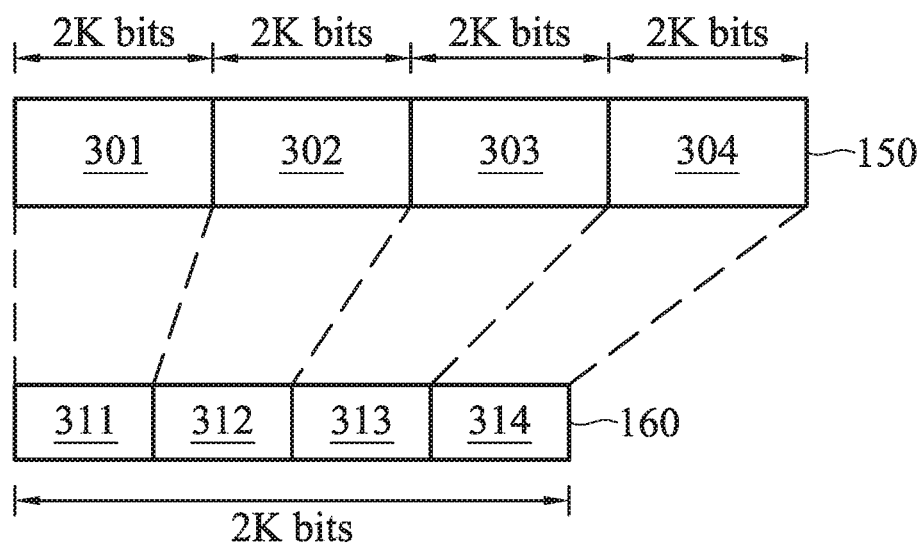
FIG. 3 is a diagram of the L1 cache and L2 cache in accordance with an embodiment of the invention.

Attention now is directed to FIG. 3 which is a diagram of the L1 cache 150 and L2 cache 160. As depicted in FIG. 3, the data (e.g., uncompressed data) stored in the L1 cache 150 may be divided into four equal segments 301~304. Given that the storage capacity of the L1 cache 150 is 8K bits, the size of each segment 301~304 may be 2K bits. When the data of each segment of the L1 cache 150 is compressed by the data compressor 155 using the first data-compression process, the compressed data of the segments 311 to 314 can be obtained, wherein the size of each of the segments 311 to 314 may be 0.5K bits, and the total storage capacity of the L2 cache 160 is 2K bits. It should be noted that the invention is not limited to the aforementioned storage capacities of the L1 cache 150 and L2 cache 160, and the data compression ratio can be adjusted according to practical conditions.

Referring to FIG. 1 again, in an embodiment, the L1 cache 150 may include a preload circuit 151 that is configured to control the L1 cache 150 to write data to the L2 cache 160 or read data (e.g., compressed data) from the L2 cache 160, and the preload circuit can be set to a software mode or a hardware mode. Similarly, the L2 cache 160 may include a preload circuit 161 that is configured to control the L2 cache 160 to write data to the DRAM 180 or read data from the DRAM 180, and the preload circuit 161 can also be set to the software mode or hardware mode.

For example, when the preload circuit 151 is set to the software mode, the preload circuit 151 may prefetch data (e.g., matrix data and associated parameters required by matrix convolution operations) to the L1 cache according to the hint information provided by the software (e.g., executed by the host or CPU). When the preload circuit 151 is set to the hardware mode, the preload circuit 151 may perform address prediction according to the previously loaded data, and prefetch data (e.g., matrix data and associated parameters required by matrix convolution operations) according to the predicted addresses.

If there is still available space in the cache line of the L1 cache 150, the preload circuit 151 may automatically sends a read request to prefetch data from the L2 cache 160, and these prefetched data will be marked as preloaded data in the L1 cache 150, wherein the preloaded data, for example, may be matrix data. Because the L1 cache 150 uses a cache replacement mechanism and the preloaded data is not referenced by the processing elements 140, the reference count of the preloaded data is 0. For example, the reference count may indicate that the number of times of the current data to be used by the processing elements 140. Each time the current data is used by the processing elements 140, the corresponding reference count is decreased by 1. When the reference count of the current data is decreased to 0, it indicates that usage of the current data has finished, and the current data can be released from the L1 cache 150. It can be understood that the preload circuit 151 still has the opportunity to replace part of the preloaded data before the preloaded data is used.

For example, in the aforementioned cache replacement mechanism to replace the data in the L1 cache 150, the priority from high to low may be unassigned cache lines, non-preload cache lines with a reference count of 0, and the preloaded cache lines. In addition, the preload operation of the preload circuit 151 in the hardware mode may increase or decrease the strength for preloading data into the L1 cache 150 according to the replacement status of the preloaded matrix data. If the preloaded matrix data in the L1 cache is quickly replaced, the preload circuit 151 will prefetch the matrix data with a higher frequency or amount of data. Conversely, if the preloaded data in the L1 cache 150 is rarely replaced, the preload circuit 151 will reduce the frequency or amount of data to prefetch data from the L2 cache 160.

The preload circuit 161 in the L2 cache 160 can also be set to the software mode or hardware mode, but the preload circuit 161 prefetches data from the DRAM 180. The behaviors of the preload circuit 161 are similar to those of the preload circuit 151, and thus the details thereof will not be described herein. It should be noted that when the preload circuit 161 is tasked to write the one-time-compressed matrix data in the L2 cache 160 to the DRAM 180 or the host buffer memory, a second compression process is performed by the compressor 163 on the one-time-compressed matrix data before writing the two-time-compressed matrix data to the DRAM 180 or the host buffer memory. Accordingly, the data written to the DRAM 180 external to the artificial intelligence integrated circuit 100 is the two-time-compressed data, and thus the amount of data during data transmission can be significantly reduced to save the bandwidth.

In view of the aforementioned embodiments, it can be understood that the L1 cache 150 and L2 cache 160 in the invention support dynamically prefetching data, thus reducing the latency of fetching data while performing matrix operations. In addition, the L1 cache 150 and L2 cache 160 in the invention further support compression storage to significantly reduce the bandwidth requirement for data storage, thereby reducing the pressure of storing the intermediate results of matrix operations.

In the aforementioned embodiments, the flow of data compression/encoding storage is described. If the access controller 144 of the processing element 140 is tasked to read data from the DRAM 180, the flow of data decompression and decoding is converse to the flow of data compression and encoding.

The mixed conversion unit 170 may be configured to perform conversion between virtual addresses to physical addresses, security checking, managing page tables, issuing command requests to different buses, global synchronization, wherein peer-to-peer PCIE equipment 182 can be connected to the mixed conversion unit 170. In addition, the mixed conversion unit 170 can be connected to other chips in the system through the high-speed bus 184.

Figure 2:
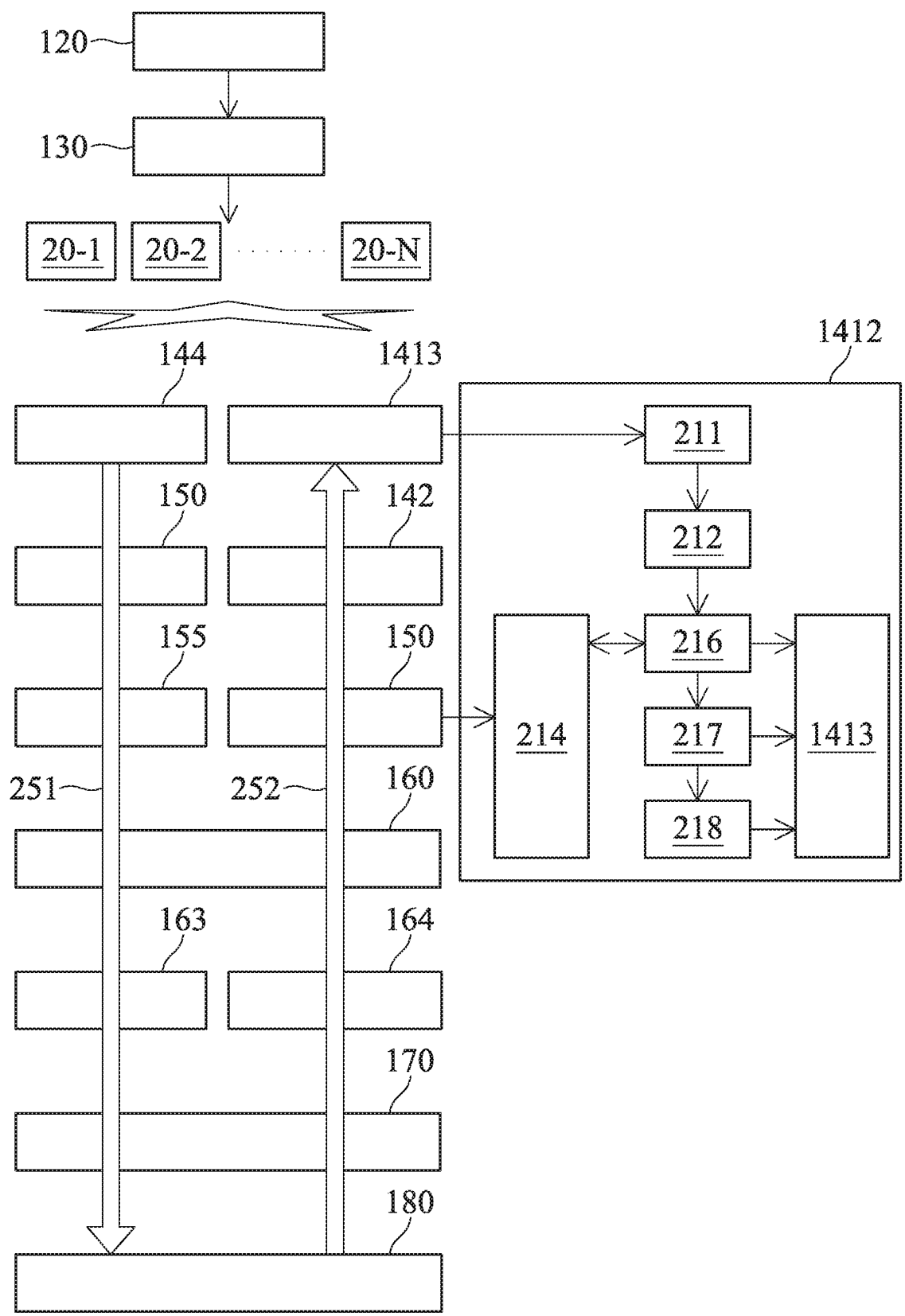
FIG. 2 is a diagram of the data-processing procedure in the artificial intelligence integrated circuit in accordance with an embodiment of the invention.

FIG. 2 is a diagram of the data-processing flow in accordance with an embodiment of the invention.

First, the command processor 10 may analyze the commands in the command queue in the command buffer 110, and provide tasks to the task constructor 130. The task constructor 130 may generate a plurality of threads 20-1 to 20-N for the processing elements 140 according to the tasks provided by the command processor 120, wherein each thread may manage 32 to 64 parallel tasks. The ALU 1411 in each processing element 140 may perform operations such as address calculation, synchronization, management, and particular calculations according to the tasks from the task constructor 130. When each processing element 140 is to perform convolution calculations (e.g., matrix convolution calculations), the threads 20-1 to 20-N may fetch the parameters and data (e.g., matrix data) required by the convolution calculation from the DRAM 180 via the access controller 144. For example, before performing the convolution calculation, the threads 20-1 to 20-N may control the access controller 144 to perform two compression processes on the matrix data that is not used yet and write the two-time-compressed matrix data to the DRAM 180 or the host buffer memory through path 251, where the details of path 251 can be found in the embodiment of FIG. 1.

Since the data stored in the DRAM 180 is two-time-compressed data (e.g., first compressed data), the first compressed data associated with the parameters and data to be fetched will be decompressed using a first-level decompression process by the decompressor 164 via the mixed conversion unit 170, wherein the first-level decompression process, for example, may include sparse matrix expansion and lossless decompression on the compressed color data to generate second compressed data.

In order to sufficiently use the bandwidth between the L1 cache 150 and the common register file 1413 in each processing element 140, the data decompressor 142 is disposed between the L1 cache 150 and the common register file 1413 of each processing element 140. For example, the bandwidth between the L1 cache 150 and each processing element 140 is limited. If the data decompressor 142 is disposed external to each processing element 140, expanded matrix data will be obtained after the data decompressor 142 performs matrix decompression on the second compressed data, and the data amount of expanded matrix data will be expanded by 4 to 8 times that of the second compressed data. Accordingly, the data decompressor 142 of the present invention is disposed between the L1 cache 150 and the common register file 1413 of each processing element 140, and is capable of serving multiple processing elements 140 simultaneously. When the processing elements 140 that are required to perform calculations have received the second compressed data from the L1 cache 150, the data decompressor 142 in each processing element 140 may decompress the second compressed data to generate the expanded matrix data, and store the expanded matrix data in the common register file 1413.

Specifically, the matrix convolution calculations in the deep-learning accelerator 1412 require a great amount of matrix data, and the matrix data is pre-stored in the common register file 1413 in each processing element 140. Accordingly, the aforementioned flow of receiving the second compressed data from the L1 cache and decompressing the second compressed data to generate the matrix data will be repeatedly for several times to accumulate the matrix data to a particular amount required for the convolution operations in the deep-learning accelerator 1412. When the matrix data stored in the common register file 1413 is ready, the deep-learning accelerator 1412 may load the matrix data from the common register file 1413 to the common register file 211 of the deep-learning accelerator 1412, and input the matrix data 212 from the common register file 211 to the matrix multiplication-addition calculator 216. The matrix multiplication-addition calculator 216, for example, may support matrix multiplication in any size and accelerated multiplication of sparse matrices, and is capable of determining the calculation of loops according to the size and sparsity of the matrices.

In some embodiments, in each clock cycle, the matrix multiplication-addition calculator 216 may perform 256 multiplication-addition calculations. If the calculation result generated by the matrix multiplication-addition calculator 216 is the final matrix multiplication-addition result, the matrix multiplication-addition calculator 216 may input the final matrix multiplication-addition result to the activation-function circuit 217 to perform activation to introduce non-linear relationship into the neural network of deep learning. The activation-function circuit 217, for example, may support functions such as rectified linear unit (ReLU), sigmod, tanh, etc., but the invention is not limited thereto. In addition, if the deep-learning accelerator 1412 determines that the result from the matrix multiplication-addition calculator 216 requires pooling or subsampling, the matrix multiplication-addition calculator 216 may input the final result to the pooling circuit 218 or the activation-function circuit 217 may input the processing result to the pooling circuit 218, thereby performing operations such as mean pooling or max pooling. The matrix multiplication-addition result processed by the activation-function circuit 217 and/or pooling circuit 218 may be the final result in one of the calculation layers in the neural network, and the final result will be written back to the common register file 1413 for use by the next calculation layer.

In view of the above, an artificial intelligence integrated circuit is provided in the invention. The artificial intelligence integrated circuit reserves the portion of common calculation (e.g., ALUs) in the GPU architecture, and includes deep-learning accelerators to perform hardware acceleration on the matrix convolution operations (e.g., including accelerated matrix multiplication in any matrix size and accelerated sparse matrix multiplication) for artificial intelligence and deep learning, and the artificial intelligence integrated circuit does not include any functional modules for 3D graphics rendering. Accordingly, in addition to supporting general APIs of the GPU (e.g., OpenCL, CUDA, DirectCompute), the artificial intelligence integrated circuit in the invention can perform artificial intelligence/deep learning related operations with a faster speed and lower power consumption compared with a conventional GPU, which means that the flexibility and ecological environment of the software, and the performance/power consumption ratio of hardware acceleration can both be considered, and the training phase and interference phase of the artificial intelligence/deep learning can be simultaneously applied.

In addition, the L1 cache and L2 cache of the artificial intelligence integrated circuit of the present invention support dynamically prefetching data to reduce the latency of fetch the matrix data during artificial intelligence operations, and can support compression storage such as feature-based matrix data compression, residue-based image compression, and sparse matrix encoding compression, which can significantly reduce the requirement for data bandwidth.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An artificial intelligence integrated circuit, comprising:
a command processor, configured to analyze a command queue to generate one or more tasks;
a plurality of processing elements, each processing element being disposed in parallel;
a task constructor, configured to receive the task from the command processor to generate a plurality of threads to control the processing elements;
a level-1 (L1) cache; and
a level-2 (L2) cache;
wherein each processing element comprises:
a plurality of arithmetic logic units (ALUs), configured to perform arithmetic and logic operations;
a plurality of deep-learning accelerators, configured to perform hardware multiplication-addition operations, activation functions, and pooling;
a common register file, configured to store data and intermediate results of operations performed by the ALUs and deep-learning accelerators; and
an access controller, configured to control data access to the L1 cache and the L2 cache;
wherein the access controller is configured to control the L1 cache and L2 cache to dynamically prefetch data stored in a memory unit external to the artificial intelligence integrated circuit, and the prefetched data is for use by matrix multiplication-addition operations performed by the deep-learning accelerators;
wherein the L1 cache comprises a first preload circuit and the L2 cache comprises a second preload circuit, and the first preload circuit and the second preload circuit prefetch data from the L2 cache and the memory unit, respectively;
wherein when the access controller is tasked to write first data to the L1 cache, the first preload circuit sends the first data to a first data compressor for a first data compression process to generate second data, and the first data compressor writes the second data to the L2 cache;
wherein the second preload circuit sends the second data to a second data compressor for a second data compression process to generate third data, and the second data compressor writes the third data to the memory unit.

2. The artificial intelligence integrated circuit as claimed in claim 1, wherein the memory unit is a dynamic random access memory.

3. The artificial intelligence integrated circuit as claimed in claim 1, wherein the memory unit is a host buffer memory of a host that is electrically connected to the artificial intelligence integrated circuit.

4. The artificial intelligence integrated circuit as claimed in claim 1, wherein the first data compression process is tasked to compress the first data using a compression algorithm for expanded matrix data to generate the second data, and the second data compression process is tasked to compress the second data using a residue-based image-compression algorithm and a sparse-matrix-compression algorithm to generate the third data.

5. The artificial intelligence integrated circuit as claimed in claim 1, wherein when the access controller is tasked to read the third data stored in the memory unit, the second preload circuit sends the third data to a second decompression circuit to perform a second data decompression process on the third data to obtain the second data,
wherein the first preload circuit directly transmits the second data to a first decompression circuit in each processing element to perform a first data decompression process on the second data to obtain the first data, and stores the first data in the common register file of each processing element.

6. The artificial intelligence integrated circuit as claimed in claim 1, wherein the artificial intelligence integrated circuit supports application programming interfaces (API) of OpenCL, CUDA, and DirectCompute.

7. The artificial intelligence integrated circuit as claimed in claim 1, wherein the artificial intelligence integrated circuit does not comprise a three-dimensional (3D) graphics rendering module.

8. The artificial intelligence integrated circuit as claimed in claim 4, wherein the deep-learning accelerator in each processing element comprises:
   a matrix multiplication-addition calculator, configured to perform a matrix multiplication-addition calculation on the first data to obtain a first matrix calculation result;
   an activation-function circuit, configured to perform activation on the first matrix calculation result to generate a second matrix calculation result; and
   a pooling circuit, configured to perform pooling on the second matrix calculation result to generate a final result, and to store the final result in the common register file.

9. The artificial intelligence integrated circuit as claimed in claim 8, wherein in response to the first data for matrix convolution calculation stored in the common register file being ready, the deep-learning accelerator loads the first data to a register file in the deep-learning accelerator, and loads the first data from the register file to the matrix multiplication-addition calculator to perform matrix multiplication-addition operations.

10. The artificial intelligence integrated circuit as claimed in claim 8, wherein the first preload circuit and the second preload circuit can be set to a hardware mode or a software mode,
   wherein in response to the first preload circuit and the second preload circuit being set to the hardware mode, the first preload circuit and the second preload circuit performs address prediction using the previously fetched data, and respectively prefetch data from the L2 cache and the memory unit according to the predicted address,
   wherein in response to the first preload circuit and the second preload circuit being set to the software mode, the first preload circuit and the second preload circuit respectively fetch data from the L2 cache and the memory unit according to hint information from software.

11. The artificial intelligence integrated circuit as claimed in claim 8, wherein the matrix multiplication-addition calculator supports matrix multiplication in any matrix size and accelerated multiplication of sparse matrices, and determines calculations of loops according to size and sparsity of matrices.

12. The artificial intelligence integrated circuit as claimed in claim 8, wherein the activation-function circuit supports rectified linear unit (ReLU), sigmod, and tanh functions.

13. The artificial intelligence integrated circuit as claimed in claim 8, wherein the pooling circuit performs mean pooling or max pooling on the second matrix calculation result to generate the final result.

* * * * *